(12) United States Patent
Watarai

(10) Patent No.: US 7,740,115 B2
(45) Date of Patent: Jun. 22, 2010

(54) BICYCLE SENSOR UNIT

(75) Inventor: Etsuyoshi Watarai, Izumi (JP)

(73) Assignee: Shimano Inc., Osaka (JP)

( * ) Notice: Subject to any disclaimer, the term of this patent is extended or adjusted under 35 U.S.C. 154(b) by 1022 days.

(21) Appl. No.: 10/995,237

(22) Filed: Nov. 24, 2004

(65) Prior Publication Data

US 2006/0108183 A1    May 25, 2006

(51) Int. Cl.
*B62L 3/00*    (2006.01)
(52) U.S. Cl. .............................. 188/24.22; 188/1.11 E
(58) Field of Classification Search .................. 701/1, 701/48; 340/432; 324/174; 188/1.11 E, 188/1.11 L, 24.22
See application file for complete search history.

(56) References Cited

U.S. PATENT DOCUMENTS 5,545,982 A    8/1996    Vlakancic
6,192,300 B1 *    2/2001    Watarai et al. ................. 701/1
6,293,140 B1    9/2001    Lohberg
6,490,507 B1 *    12/2002    Campagnolo .................. 701/1
6,523,772 B2 *    2/2003    Ueno ....................... 242/400.1

* cited by examiner

*Primary Examiner*—Christopher P Schwartz
(74) *Attorney, Agent, or Firm*—Global IP Counselors, LLP

(57) ABSTRACT

A bicycle sensor unit is provided that comprises a bicycle brake part and a sensor fixedly attached to the bicycle brake part to detect rotational behavior of a bicycle wheel. The bicycle brake part is one of a bicycle brake attachment member configured to be non-movably coupled to a bicycle frame and a bicycle brake arm configured to support a bicycle brake pad for movement against a rim of the bicycle wheel. Preferably, the sensor unit is part of a bicycle brake device that comprises both the bicycle brake attachment member and the bicycle brake arm, a bicycle brake pad and the sensor.

8 Claims, 15 Drawing Sheets

BICYCLE SENSOR UNIT

BACKGROUND OF THE INVENTION

1. Field of the Invention

This invention generally relates to a bicycle sensor unit. More specifically, the present invention relates to a bicycle sensor unit, which is integrated with a bicycle brake device.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Recently, the bicycle industry has added various electronic components to the bicycle. These electronic components are often controlled by a cycle computer, which controls the components based on information such as speed, cadence, rider inputs, etc. Cycle computers can also be used simply to make bicycle riding more enjoyable (e.g. by displaying various information to the rider such as time, elapsed time, speed, distance, average speed, etc.).

In any case, the cycle computer is typically mounted on the bicycle handlebar and is electrically coupled to various components and/or sensors in order to control components and/or display various information to the rider. Usually, at least one sensor is coupled to the front fork in order to sense the rotational behavior of a magnet that is coupled to the front wheel. The front fork is non-movably coupled to the handlebar and pivotally coupled to the frame so that the rider can steer the bicycle. The magnet is typically coupled to the spokes of the front wheel.

While these typical cycle computers and electrical components work well, there are some drawbacks. In particular, the sensor coupled to the front fork often has a wire that needs to be routed up the fork, past the front brake device and along the frame to the cycle computer mounted on the handlebar. If the wire is too long, which is usually the case, the wire needs to be wound around various parts of the bicycle (e.g. the front fork, the front braking device and the frame) until the wire is the appropriate length. If the wire is wound too much, the wire can bind when the fork is turned. If the wire is not wound enough, the wire can be more easily caught on obstructions. Thus, it is difficult and/or inconvenient to optimally install these prior sensors. This problem is exaggerated when the sensor is coupled to a suspension fork. Also, it can relatively difficult and/or inconvenient to properly install the prior magnets on the spokes of the wheel. Finally, even if these prior devices are installed properly, the wire, sensor and/or magnet can be contacted relatively easily by obstructions or debris. This contact can cause damage or move parts out of proper alignment.

In view of the above, it will be apparent to those skilled in the art from this disclosure that there exists a need for an improved bicycle sensor unit, which can be integrated with a bicycle brake device. This invention addresses this need in the art as well as other needs, which will become apparent to those skilled in the art from this disclosure.

SUMMARY OF THE INVENTION

One object of the present invention is to provide a bicycle sensor unit, which can be integrated with a bicycle brake device in simple, unobtrusive manner.

Another object of the present invention is to provide a bicycle sensor unit, which can be retrofitted with an existing bicycle brake device.

Yet another object of the present invention is to provide a bicycle sensor unit for a bicycle brake device, which is relatively simple and inexpensive to manufacture, assemble and/or retrofit to existing bicycles.

The foregoing objects can basically be attained by providing a bicycle sensor unit that comprises a bicycle brake part and a sensor fixedly attached to the bicycle brake part to detect rotational behavior of a bicycle wheel. The bicycle brake part is one of a bicycle brake attachment member configured to be non-movably coupled to a bicycle frame and a bicycle brake arm configured to support a bicycle brake pad for movement against a rim of the bicycle wheel.

The foregoing objects can also basically be attained by a bicycle brake device that comprises a bicycle brake attachment member, a bicycle brake arm, a bicycle brake pad and a sensor. The bicycle brake attachment member is configured to be non-movably coupled to a bicycle frame. The bicycle brake arm is coupled to the bicycle brake attachment member. The bicycle brake pad is attached to the bicycle brake arm, and is configured to be selectively pressed against a bicycle wheel rim. The sensor is fixedly attached to either the bicycle brake attachment member or the bicycle brake arm to detect rotational behavior of a bicycle wheel.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
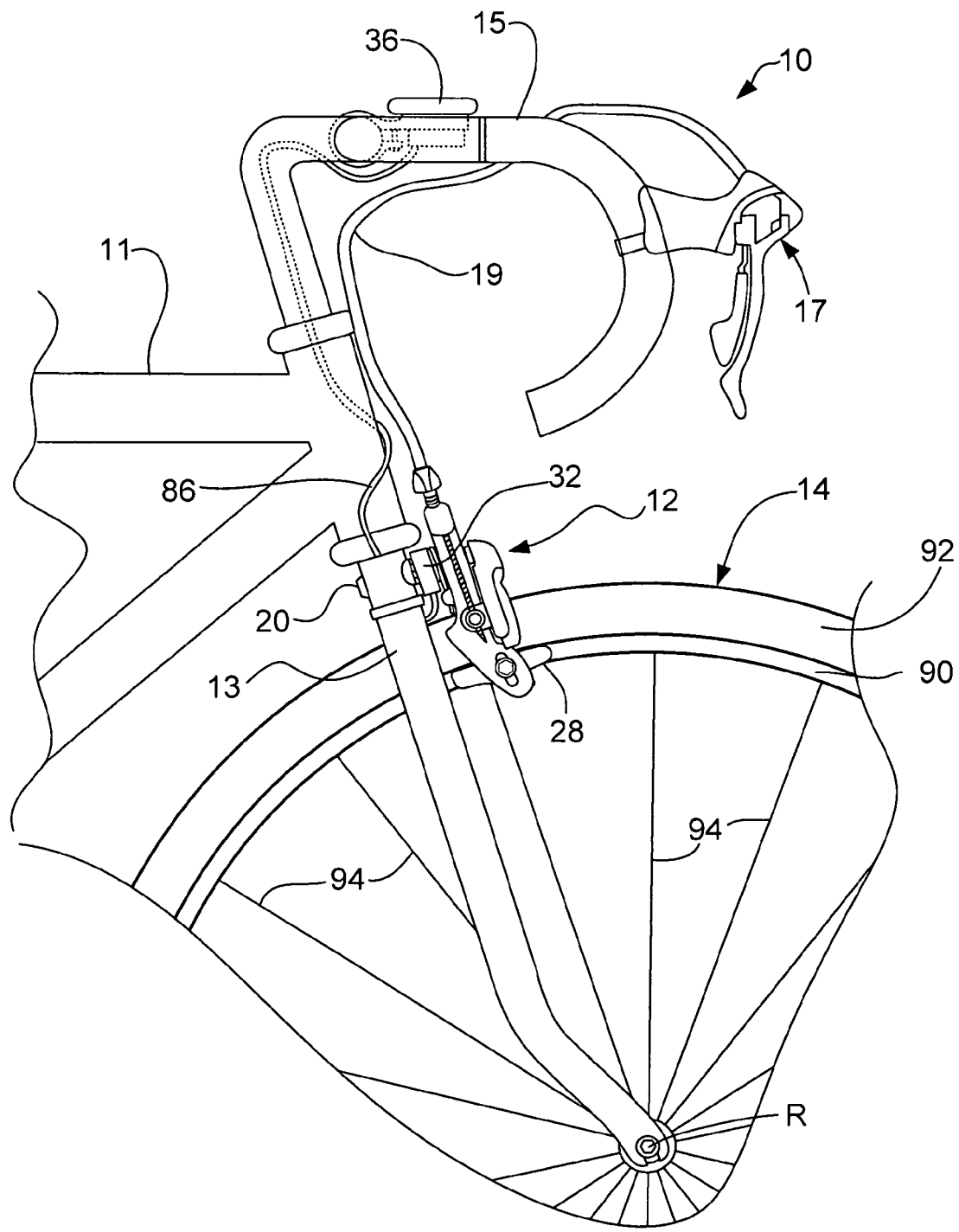
FIG. 1 is a side elevational view of a portion of a bicycle equipped with a bicycle brake device in accordance with a first embodiment of the present invention.

Referring initially to FIG. 1, a front portion of a bicycle 10 with a bicycle brake device 12 and a front wheel 14 coupled thereto is illustrated in accordance with a first embodiment of the present invention. The bicycle 10 is conventional, except for the brake device 12 and the front wheel 14. Thus, the bicycle 10 includes a frame 11 with a front fork 13 pivotally coupled thereto. The front wheel 14 is rotationally coupled to the front fork 13 in a conventional manner to rotate about a rotation axis R. A handlebar 15 is fixedly coupled to the front fork 13 to steer the bicycle 10 by turning the front wheel 14 in a conventional manner. At least one conventional bicycle brake/shift control device 17 is mounted on the handlebar 15 to operate the brake device 12 via a brake control cable 19 in a conventional manner. The brake control cable 19 basically includes an inner wire 19a and an outer sheath 19b in a conventional manner. Because the bicycle 10 is conventional, except for the brake device 12 and the front wheel 14, the bicycle 10 will not be discussed and/or illustrated in detail herein, except as needed to make and use the present invention.

Referring now to FIGS. 1-6, the bicycle brake device 12 of the present invention will now be explained in more detail. Preferably, the bicycle brake device 12 basically includes a bicycle brake attachment member 20, a first brake arm 22, a second brake arm 24, a link member 26, a pair of brake pads 28, a biasing member 30, a sensor 32, a wheel magnet 34 and a cycle computer 36. The brake attachment member 20, the first brake arm 22, the second brake arm 24, the link member 26, the brake pads 28 and the biasing member 30 generally constitute a primary braking structure, while the remaining parts of the bicycle brake device 12 are add-on or auxiliary parts of the bicycle braking device 12. However, it will be apparent to those skilled in the bicycle art from this disclosure that at least the sensor 32 can be integrated with the primary braking structure as needed and/or desired.

The brake attachment member 20 is fixedly, non-movably attached to the front fork 13 of the bicycle 10 in a conventional manner. The brake pads 28 are preferably fixedly attached to the brake arms 22 and 24 in a conventional manner. The mounting member 20, the first brake arm 22, the second brake arm 24, the link member 26 and the biasing member 30 are preferably coupled together in a conventional manner to normally bias the brake pads 28 out of engagement (i.e. away from) the front wheel 14 in a conventional manner. Thus, when the rider actuates the brake lever of the shift/brake control device 17, the inner wire 19a is pulled to move the brake pads 28 toward each other in a conventional manner.

On the other hand, the sensor 32 is preferably fixedly attached to the brake attachment member 20 in accordance with the present invention, while the wheel magnet 34 is preferably integrated with the front wheel 14 in accordance with the present invention, as explained below. In any case, the sensor 32 is preferably integrated with a part of the brake device 12 that is separate from the brake pads 28 (i.e. the brake attachment member 20 and/or the brake arms 22 and 24). The cycle computer 36 is clamped onto the handlebar 15 in a conventional manner. The cycle computer 36 receives electrical signals from the sensor 32, as explained below in more detail.

Referring now to FIGS. 5-8, the brake mounting member 20 basically includes a main brake fixing bolt 40, a brake fixing nut 42 and a frame fixing nut 44 as well as a variety of spacers/washers arranged on the main fixing bolt in a conventional manner. The brake fixing nut 42 is threaded onto the main fixing bolt 40 to retain the first brake arm 22 and the link member 26 thereon. The frame fixing nut 44 is used to non-movably fix the mounting member 20 to the front fork 13 in a conventional manner.

Referring still to FIGS. 5-8, the first brake arm 22 basically includes a main mounting portion 50, a cable support portion 52 and a first brake pad mounting portion 54. The main mounting portion 50 is pivotally supported on the main fixing bolt 40. The main mounting portion 50 has an adjustment screw 56 received in a threaded bore that is formed in the free end thereof to control the amount of relative movement between the first and second brake arms 22 and 24 in a conventional manner. The cable support portion 52 has a barrel adjuster 58 coupled thereto in a conventional manner to receive the inner wire 19a therethrough and to partially receive the outer casing 19b. The brake pad mounting portion 54 has one of the brake pads 28 fixedly attached thereto via a screw and washer in a conventional manner.

Referring still to FIGS. 5-8, the second brake arm 24 basically includes a main mounting portion 60, a cable attachment portion 62 and a second brake pad mounting portion 64. The main mounting portion 60 has a secondary fixing bolt 66 non-movably fixed thereto to extend parallel to the main fixing bolt 40. The main mounting portion 60 further includes a protruding area (not shown) arranged to selectively contact the adjustment screw 56 of the first brake arm in a conventional manner. The secondary fixing bolt 66 is pivotally supported by the link member 26. The cable attachment portion 62 has an adjustable wire fixing structure 68 coupled thereto in a conventional manner. The adjustable wire fixing structure 68 has the inner wire 19a fixed thereto in a conventional manner. The brake pad mounting portion 64 has one of the brake pads 28 fixedly attached thereto via a screw and washer in a conventional manner.

Referring still to FIGS. 5-8, the link member 26 basically includes a main mounting portion 70 and a secondary mounting portion 72. The main mounting portion is non-movably fixedly coupled on the main fixing bolt 40, while the secondary mounting portion 72 is pivotally supported in the secondary fixing bolt 66 in a conventional manner. Thus, the link member 26 can be considered to be a non-movable part of the mounting member 20. The arrangement of the link member 26 helps control the movement of the first and second brake arms 22 and 24.

The biasing member 30 is preferably a coil spring having a first end 30a, a second end 30b and a coiled portion 30c. The first end 30a is engage with the link member 26 in a conventional manner, while the second end 30b is engaged with the first brake arm 22 in a conventional manner. The coiled portion 30c is arranged between the first and second ends 30a and 30b. The biasing member 30 normally biases the brake pads 28 laterally away from each other and laterally away from the front wheel 14 so that the front wheel can normally freely rotate about the rotation axis R in a conventional manner. The brake pads 28 are moved toward each other and toward the wheel 14 against the biasing force of the biasing member 30 when the brake lever of the brake/shift control device is moved to pull the inner wire 19a in a conventional manner.

Basically, in this embodiment, the brake attachment member 20, the first brake arm 22, the second brake arm 24, the link member 26, the brake pads 28 and the biasing member 30 form a conventional primary braking structure that operates in a conventional manner to apply a braking force to the front wheel 14. Thus, the parts of the primary braking structure will not be explained and/or illustrated in further detail herein. However, it will be apparent to those skilled in the art from this disclosure that the sensor 32 can be integrated with one or more of these parts in accordance with the present invention, as explained below with reference to other preferred embodiments of the present invention.

Referring to FIGS. 1 and 5-8, the sensor 32 is preferably fixedly attached to the mounting member 20. In any case, the sensor 32 is preferably fixedly attached to one of the mounting member 20, the first brake arm 22 and the second brake arm 24. In this embodiment, the sensor 32 is preferably is supported on the main brake fixing bolt 40 of the mounting member 20 to form a sensor unit in accordance with the present invention.

Specifically, the sensor 32 basically includes a mounting portion 80, a sensor element 82 a threaded fastener 84 and an electrical wire 86. The mounting portion 80 basically has a U-shaped configuration with a pair of free ends 80a and 80b. The free ends 80a and 80b together with the fastener 84 form parts of a fastening structure in accordance with the present invention, which is utilized to clamp the mounting portion 80 with the sensor element 82 onto the mounting member (i.e. the main fixing bolt 40). Specifically, the mounting portion 80 is preferably clamped onto the brake fixing nut 42 of the mounting member 20. The sensor element 82 is conventional, except that it is shaped to be mounted with the mounting portion 80. The sensor element 82 of the sensor 32 is electrically coupled to the cycle computer 36 via the electrical wire 86. Accordingly, the sensor element 82 will not be discussed in further detail herein.

Figure 7:
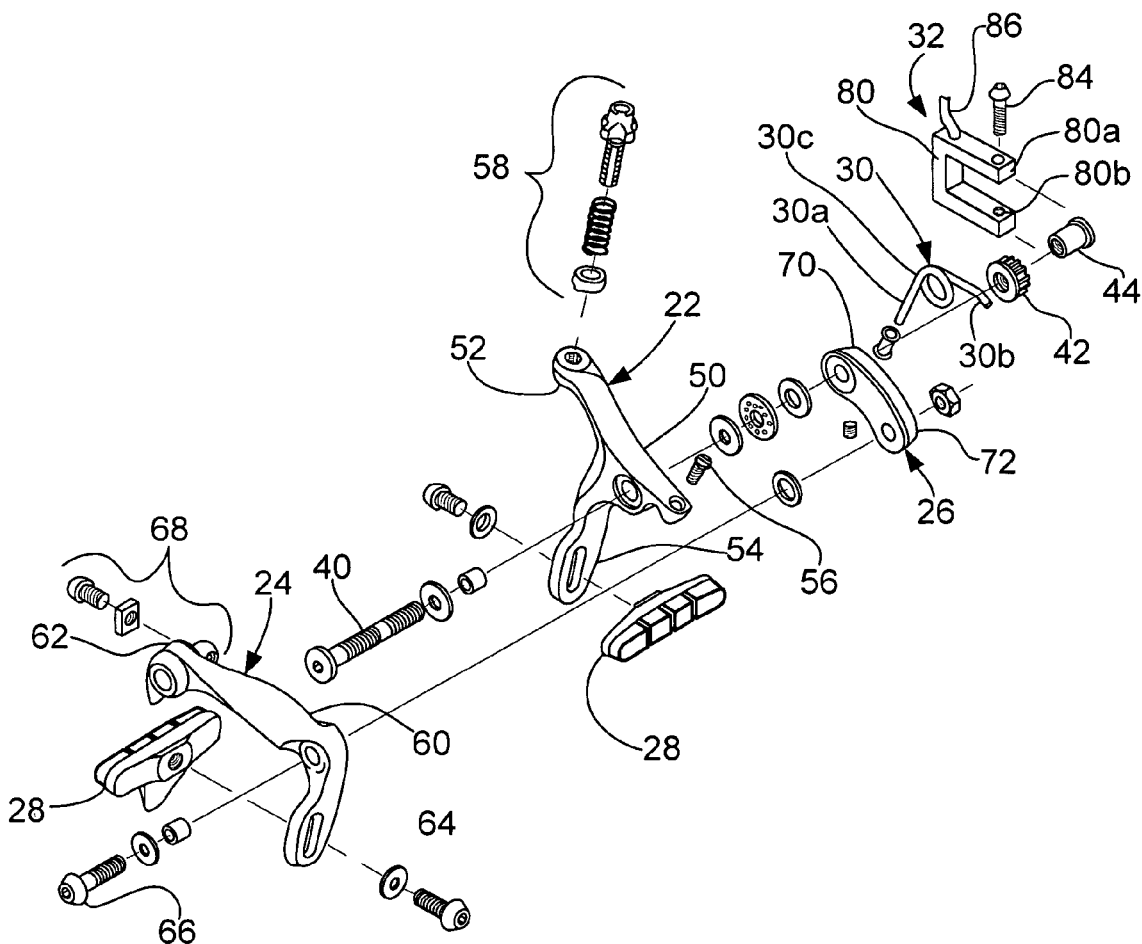
FIG. 7 is an exploded perspective view of the primary braking structure and the sensor of the brake device illustrated in FIGS. 1-6.
Figure 8:
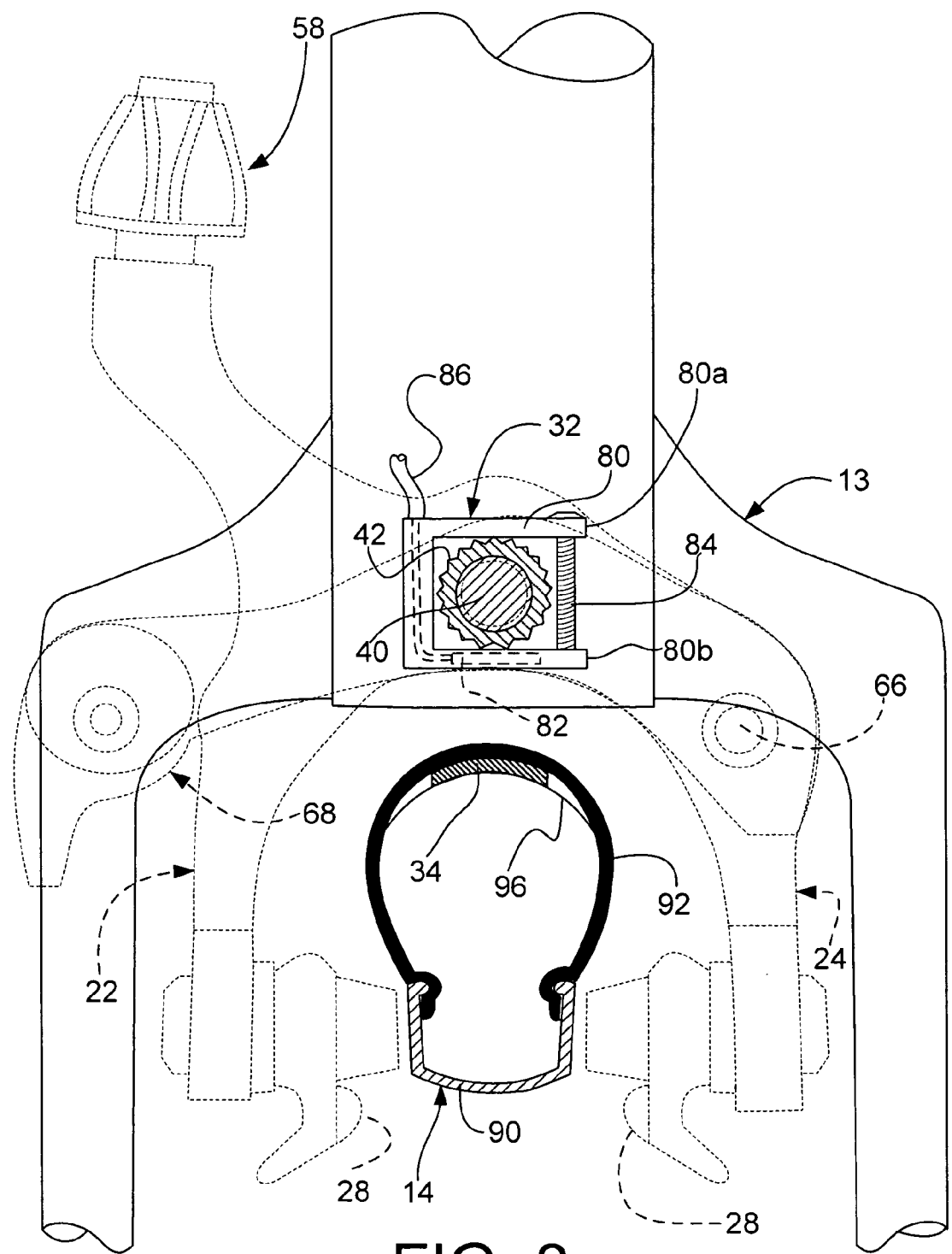
FIG. 8 is a further enlarged, front elevational view of the structure illustrated in FIG. 6, with portions removed and other portions shown in broken lines for the purpose of illustration.

The brake fixing nut 42 preferably has a non-circular (e.g. splined) external surface as seen in FIG. 7. Thus, the mounting portion 80 can be non-rotatably clamped onto the brake fixing nut 42. In this embodiment, the sensor 32 is designed to be mounted onto the mounting member 20 as an add-on to form a sensor unit in accordance with the present invention. In other words, in this embodiment, the sensor 32 is designed to be added (i.e. retrofitted) onto a conventional bicycle brake axle. However, it will be apparent to those skilled in the art from this disclosure that the sensor 32 may be further integrated with a part of a brake device mounting member to form one or more replacement parts (i.e. a sensor unit) for a brake device in accordance with the present invention.

Referring now to FIGS. 1, 5, 6 and 8, the front bicycle wheel 14 in accordance with the present invention will now be explained in more detail. The bicycle wheel 14 is conventional, except the wheel magnet 34 is incorporated therewith in accordance with the present invention. Specifically, the front wheel 14 basically includes a central hub (not shown), an annular wheel rim 90 (only a portion shown), an annular tire 92 (only a portion shown) and a plurality of spokes 94 (only a portion shown). Of course, it will be apparent to those skilled in the bicycle art from this disclosure that the bicycle wheel 14 preferably has a continuous circular shape with a substantially uniform cross-section (except at the location of the wheel magnet 34) even though only a portion of the front wheel 14 is illustrated herein.

The wheel magnet 34 is a thin slightly curve plate member constructed of a magnetic material using conventional manufacturing techniques. The wheel magnet 34 is fixed to the interior wall of the tire 92 via adhesive or the like at a radially outermost location. A piece of protective tape 96 is then placed over the wheel magnet 34 to further attach the wheel magnet 34 to the interior wall of the tire 92. The wheel magnet 34 is coupled to the tire 92 independently of the rim 90. In other words, the rim 90 does not assist in holding the wheel magnet 34 in place. The tire 92 is conventional, except for the presence of the wheel magnet 34 and the protective tape 96. Thus, the tire 92 can be a tube tire or a tubeless tire in a conventional manner. In any case, the wheel magnet 34 is preferably coupled to the tire 92 without the need for support from the rim 90 (i.e. separately from the rim 90) and/or a tube, even though a tube could assist in holding the wheel magnet 34 in place. Of course, it will be apparent to those skilled in the bicycle art from this disclosure that the as an alternative attachment method, the wheel magnet 34 could be embedded in the tire 92 (e.g. embedded in the rubber of the tire 92).

Figure 2:
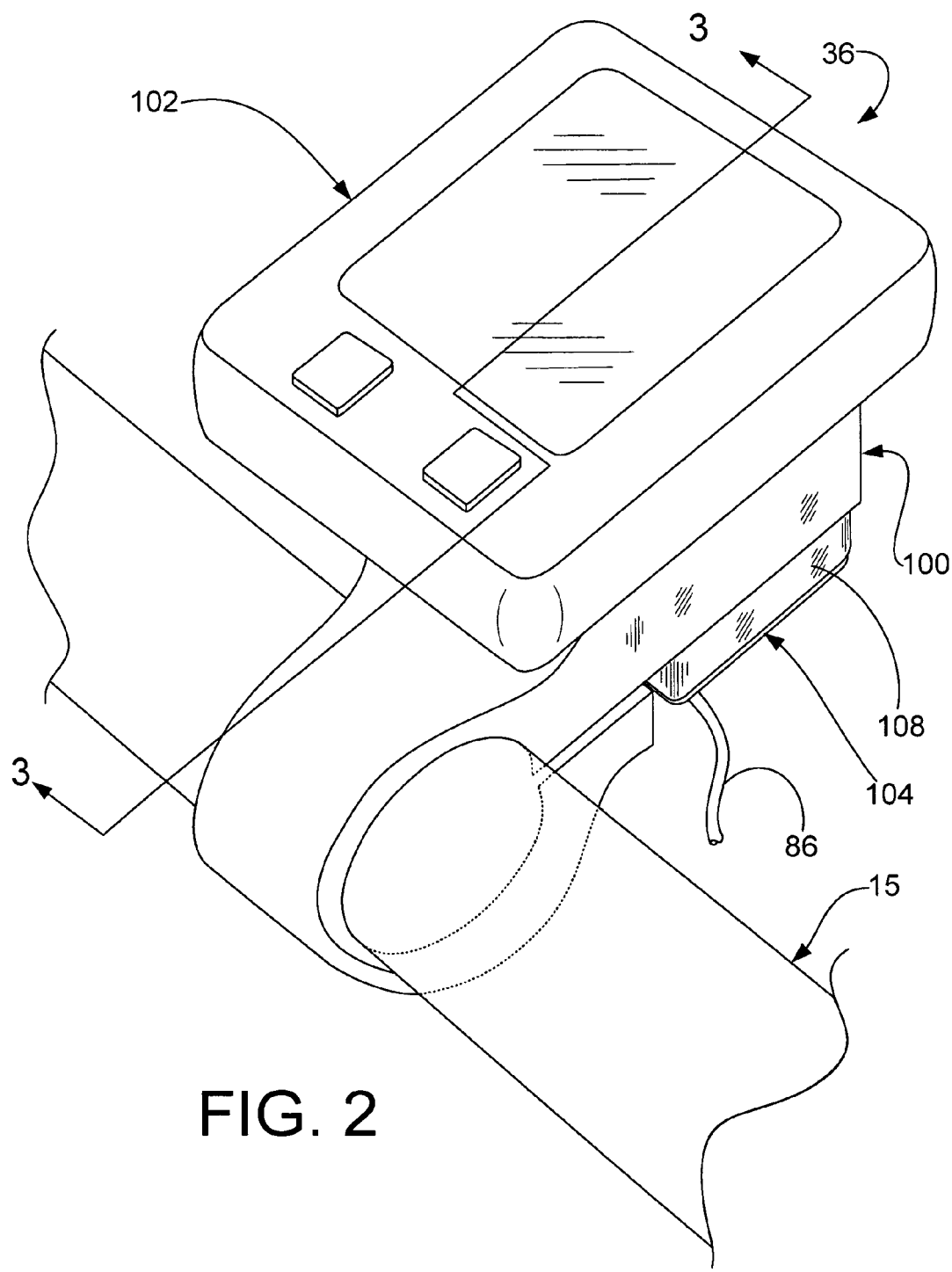
FIG. 2 is an enlarged, top perspective view of the cycle computer of the bicycle brake device illustrated in FIG. 1.
Figure 3:
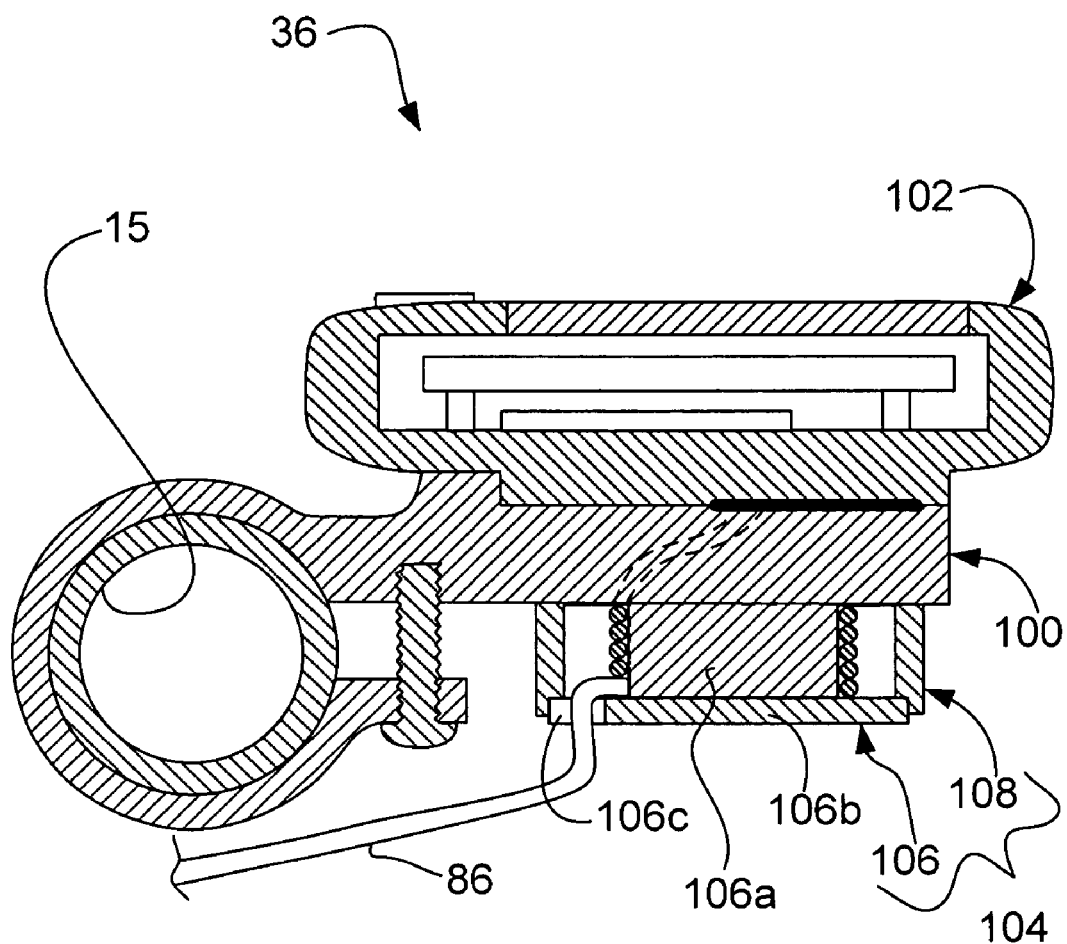
FIG. 3 is a cross-sectional view of the cycle computer illustrated in FIGS. 1 and 2, as seen along section line 3-3 of FIG. 2.
Figure 4:
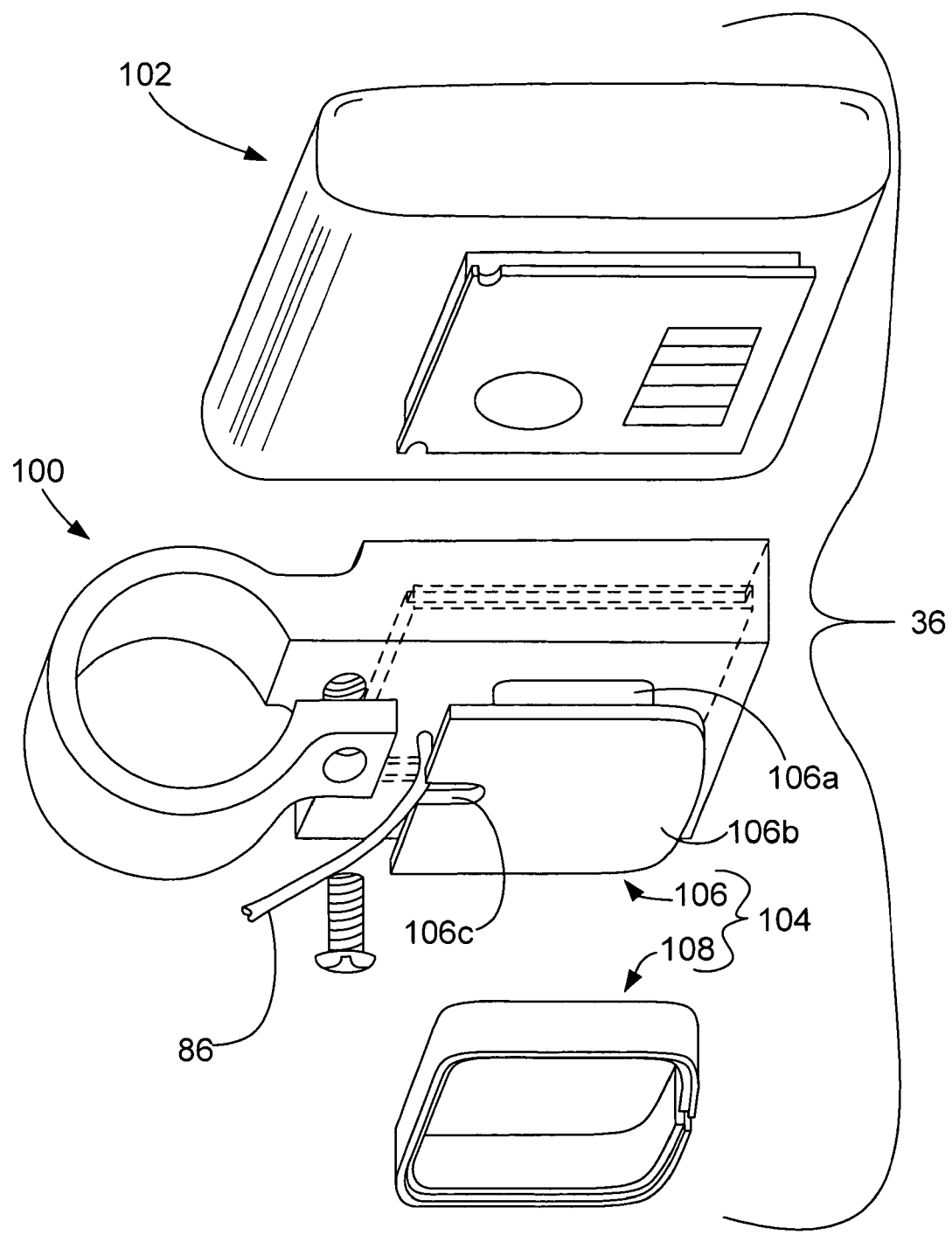
FIG. 4 is an exploded, bottom perspective view of the cycle computer illustrated in FIGS. 1-3, removed from the handlebar for the purpose of illustration.
Figure 5:
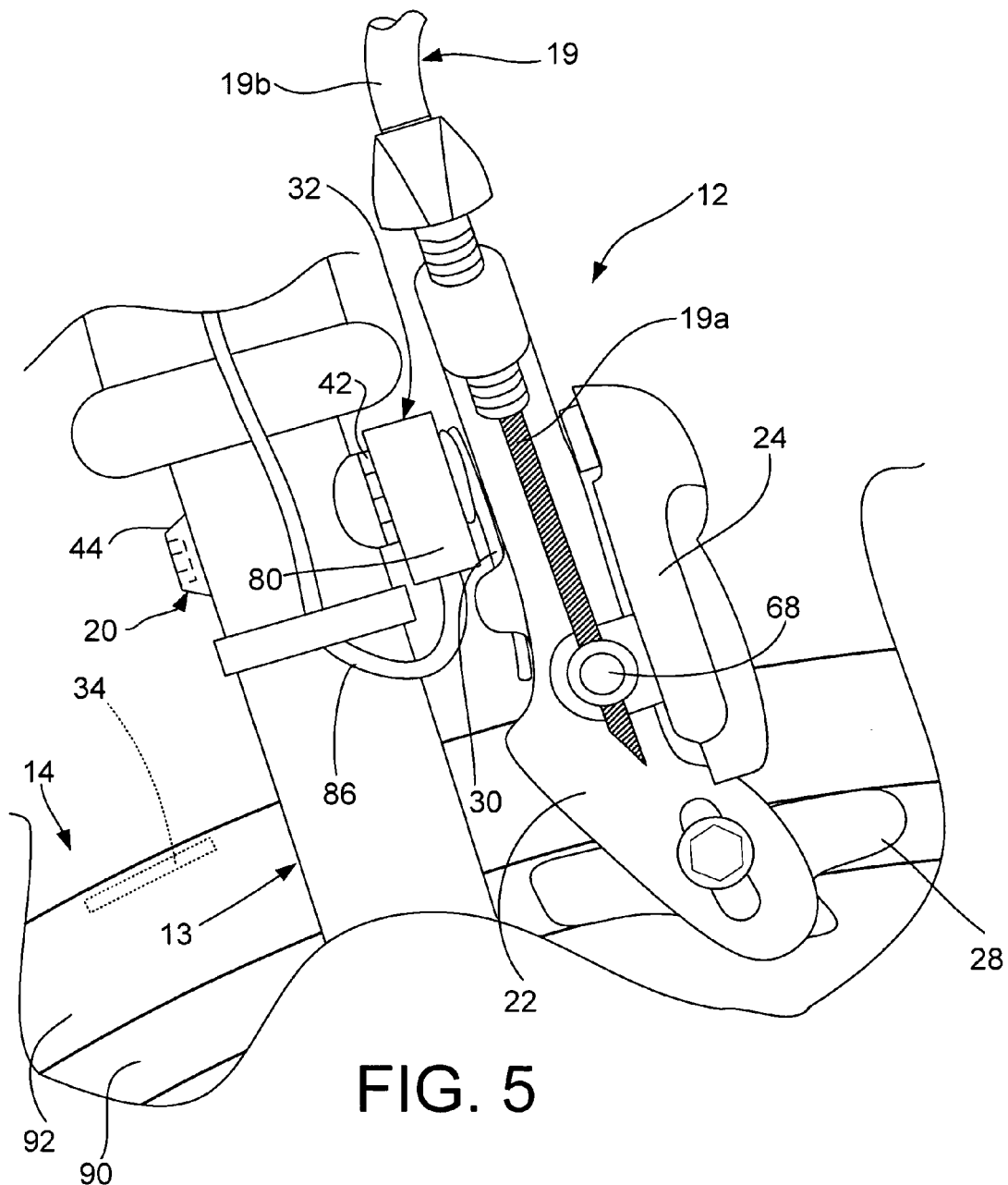
FIG. 5 is an enlarged, side elevational view of the bicycle brake device mounted to the portion of the bicycle illustrated in FIG. 1, to better illustrate the primary braking structure, the sensor and the wheel magnet of the braking device.
Figure 6:
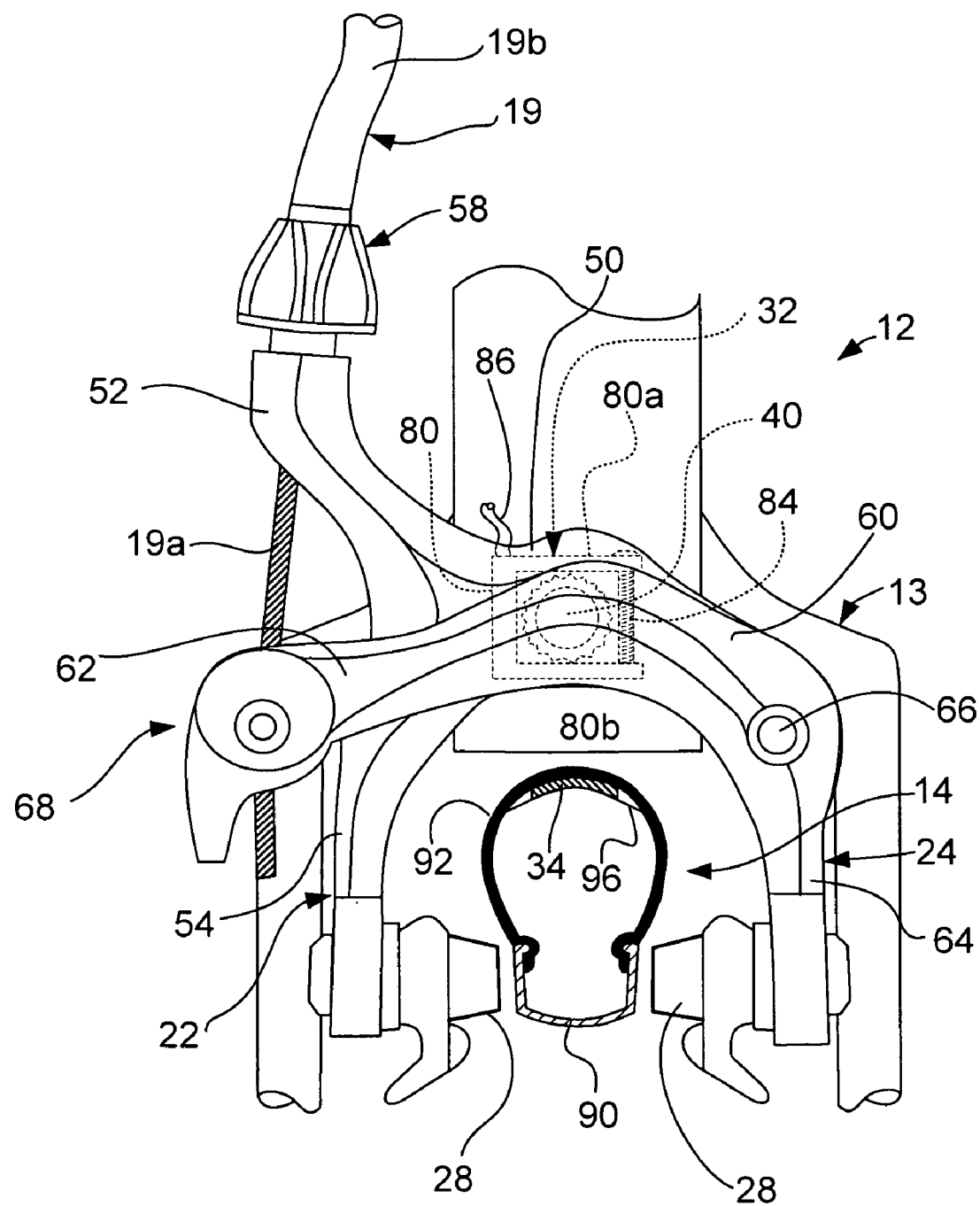
FIG. 6 is a front elevational view of the bicycle brake device mounted to the portion of the bicycle illustrated in FIG. 5.

Referring to FIGS. 2-4, the cycle computer 36 will now be explained in more detail. The cycle computer 36 basically includes a handlebar attachment unit 100 and a main computer unit 102 releasably coupled to the handlebar attachment unit 100. The cycle computer 36 is conventional, except the handlebar attachment unit 100 includes a wire winding mechanism 104 designed to retain any excess slack in the electrical wire 86 extending from the sensor 32.

The main computer unit 102 basically is conventional. Thus, the main computer basically includes a power supply (battery), a central processing unit (CPU), a read only memory (ROM), a random access memory (RAM), an I/O interface, a display screen (LCD), a pair of user operable buttons, etc, in a conventional manner. The main computer unit 102 is detachably coupled to the handlebar attachment unit 100 via a sliding snap-fit type arrangement in a conventional manner. When the main computer unit 102 is coupled to the handlebar attachment unit 100, electrical contacts of the main computer unit 102 are electrically coupled to electrical contacts of the handlebar attachment unit 100 in a conventional manner. Because the main computer unit 102 is basically conventional, the main computer unit 102 will not be discussed in further detail herein.

The handlebar attachment unit 100 is conventional, except for the presence of the wire winding mechanism 104. Thus, the handlebar attachment unit 100 basically includes a clamping portion designed to be clamped onto the handlebar 15 with a fastener in a conventional manner, and a computer support portion that has the main computer unit 102 slideably snap-fitted therewith in a conventional manner. The electrical wire 86 extends from the bottom of the main computer unit 102 in a conventional manner. The wire 86 is electrically coupled to the electrical contacts of handlebar attachment unit 100 in order to electrically couple the main computer unit 102 to the sensor 32. Because the handlebar attachment unit 100 is basically conventional (i.e. except for the winding mechanism 104), the handlebar attachment unit 100 will not be discussed in further detail herein, except as related to the wire winding mechanism 104.

The wire winding mechanism 104 basically includes a spool member 106 configured to have the electrical wire 86 wound around the spool member 106, and a spool cap 108 detachably coupled to the spool member 106 to retain the electrical wire 86 on the spool member 106. Specifically, any excess of the electrical wire 86 is first wound around the spool member 106, and then the spool cap 108 is snapped onto the spool member 106 to prevent unwinding of the electrical wire 86.

More specifically, the spool member 106 has a winding portion 106a with a tubular external surface and a retaining portion 106b that is larger than the winding portion 106a to prevent the wound electrical wire 86 from falling off of the winding portion 106a. The spool cap 108 is mounted around the outer periphery of the retaining portion 106b to form a tubular cavity for the electrical wire 86. The retaining portion 106b has a notch or cutout 106c formed therein so that the electrical wire 86 can extend out of the tubular cavity to the sensor 32.

Second Embodiment

Figure 9:
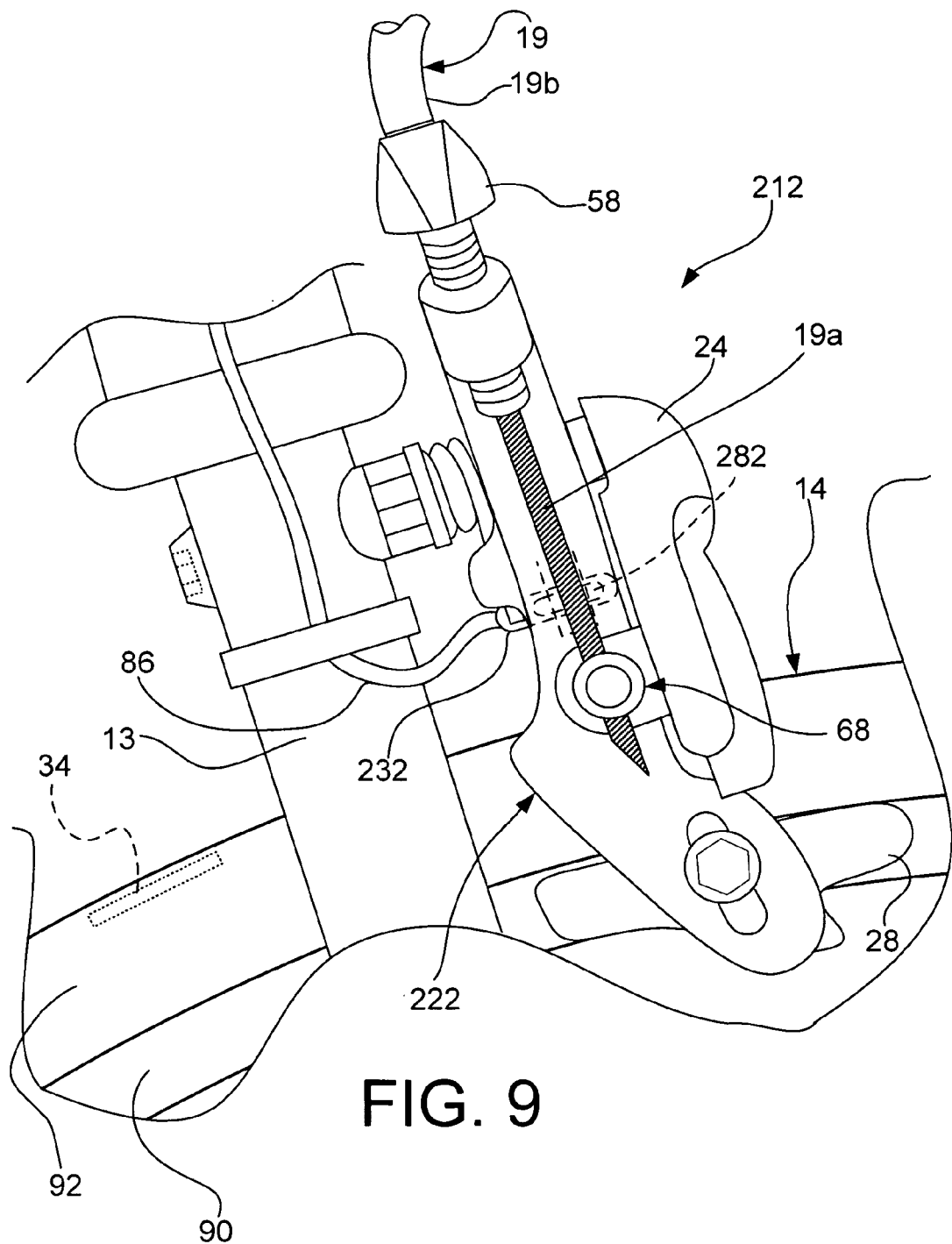
FIG. 9 is an enlarged side elevational view of a portion of a brake device in accordance with a second embodiment of the present invention.
Figure 10:
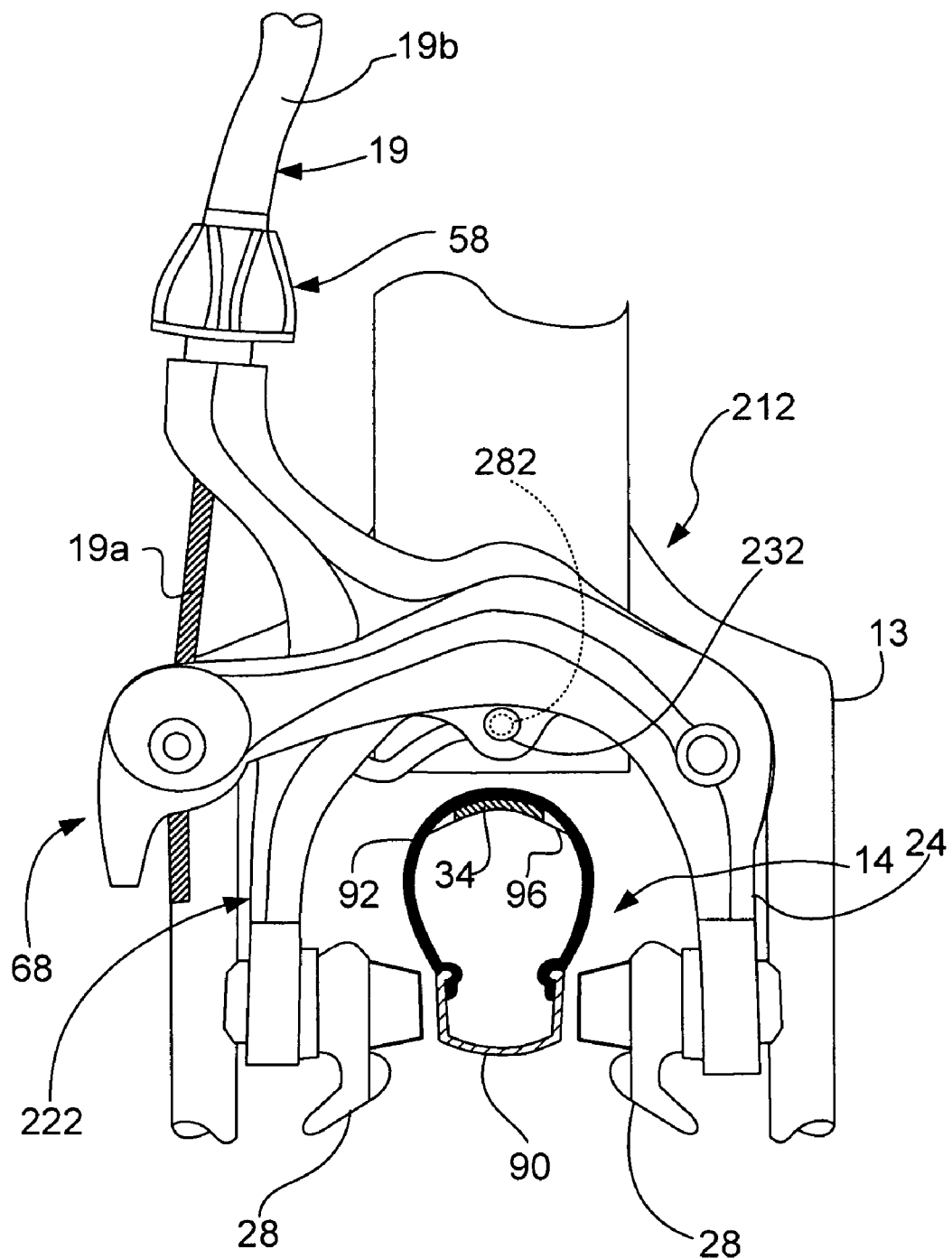
FIG. 10 is a front elevational view of the portion of the brake device illustrated in FIG. 9.

Referring now to FIGS. 9 and 10, a modified braking device 212 in accordance with a second embodiment will now be explained. The braking device 212 is identical to the braking device 12 of the first embodiment, except the modified braking device 212 has a modified sensor 232 instead of the sensor 32 of the first embodiment, and a modified first brake arm 222 instead of the brake arm 22 of the first embodiment. In view of the similarity between the first and second embodiments, the parts of the second embodiment that are identical to the parts of the first embodiment will be given the same reference numerals as the parts of the first embodiment in FIGS. 9 and 10. Moreover, in view of the similarity between the first and second embodiments, it will be apparent to those skilled in the art from this disclosure that the descriptions and illustrations of the first embodiment also apply to this second embodiment, except as explained and illustrated herein. In other words, the descriptions of the parts of the second embodiment that are identical to the parts of the first embodiment may be omitted for the sake of brevity.

The brake device 212 basically includes the bicycle brake attachment member 20, the modified first brake arm 222, the second brake arm 24, the link member 26 (illustrated in the first embodiment), the pair of brake pads 28, the biasing member 30, the modified sensor 232, the wheel magnet 34 and the cycle computer 36 (illustrated in the first embodiment). In this embodiment, the modified sensor 232 is integrated with the primary braking structure. Specifically, the modified sensor 232 is preferably a cylindrical element that is press-fitted and/or snap fitted into a correspondingly sized recess of the modified brake arm 222. The sensor 232 includes a sensor element 282 enclosed therein that is electrically coupled to the cycle computer 36 via the electrical wire 86. The sensor 232 and the sensor element 282 are functionally identical to the corresponding parts of the first embodiment. In other words, the sensor 232 and the sensor element 282 are identical to the sensor 32 and sensor element 82 of the first embodiment, except the sensor 232 and the sensor element 282 have different shapes in this embodiment than the first embodiment such that the sensor 232 can be mounted in the recess of the modified brake arm 222.

Third Embodiment

Figure 11:
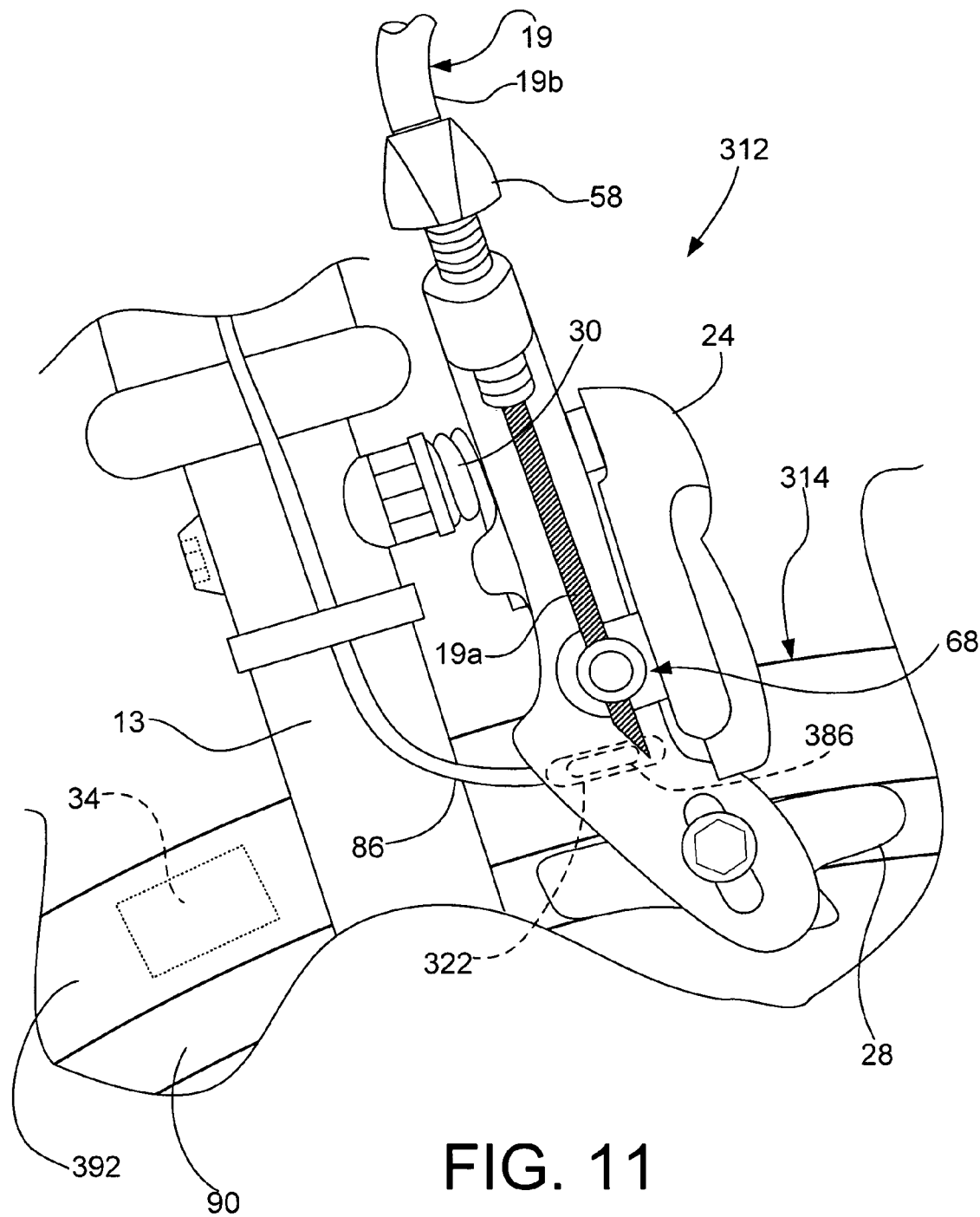
FIG. 11 is an enlarged side elevational view of a portion of a brake device in accordance with a third embodiment of the present invention.
Figure 12:
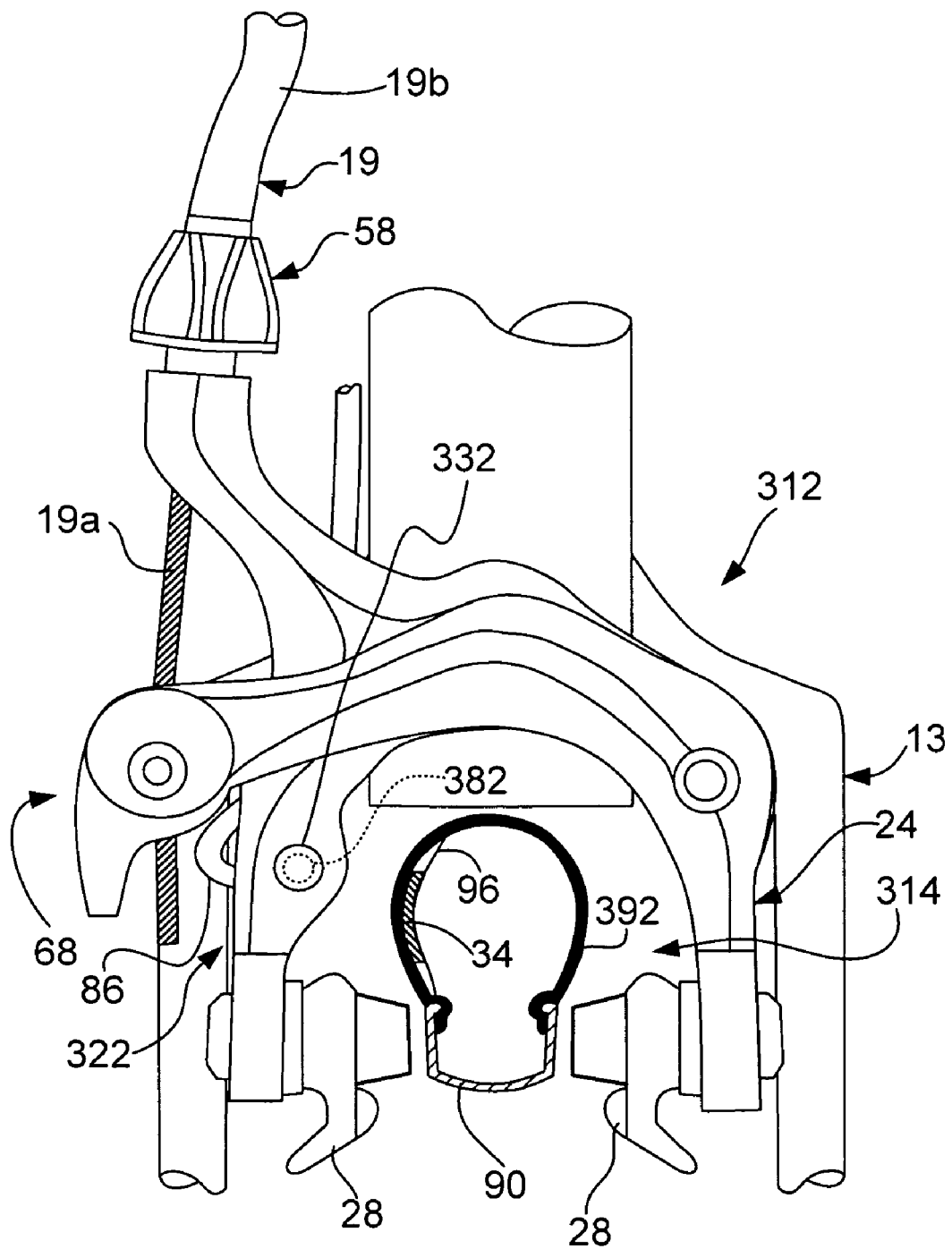
FIG. 12 is a front elevational view of the portion of the brake device illustrated in FIG. 11.
Figure 13:
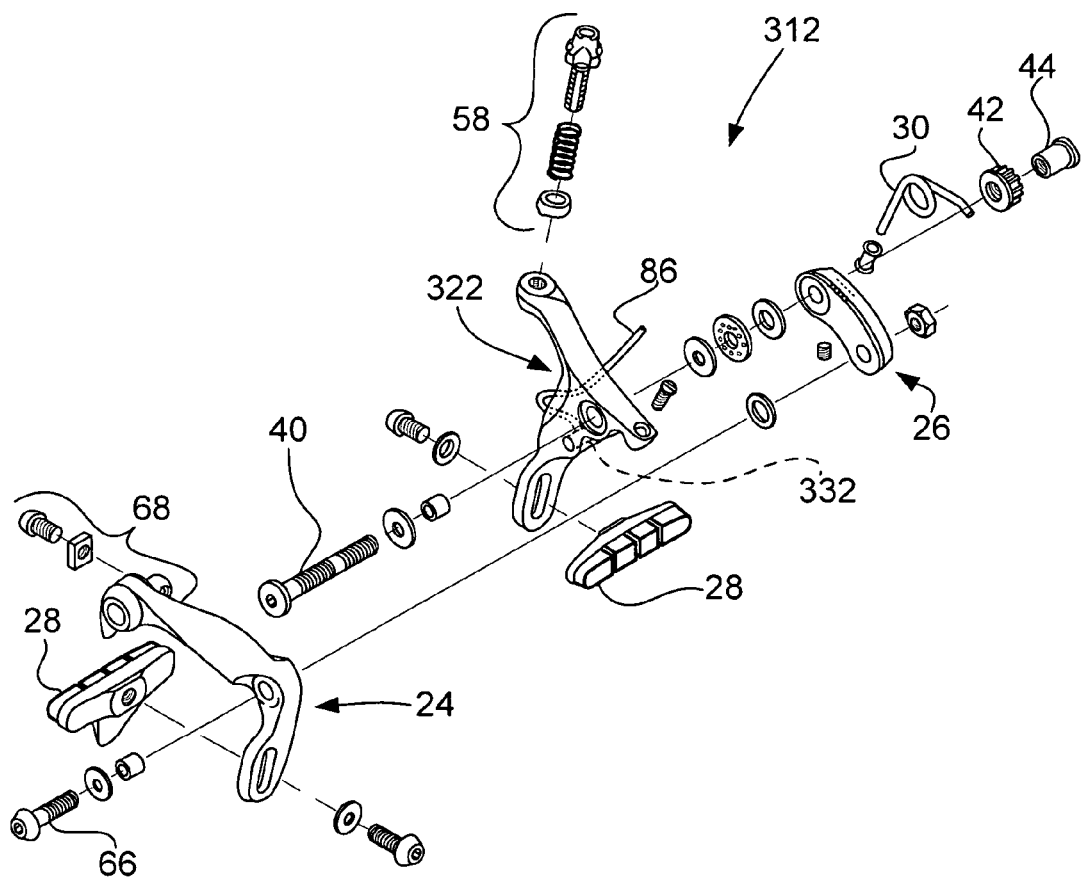
FIG. 13 is a partial, exploded perspective view of the portion of the brake device illustrated in FIGS. 11 and 12.

Referring now to FIGS. 11-13, a modified braking device 312 in accordance with a third embodiment will now be explained. The braking device 312 is identical to the braking device 12 of the first embodiment, except the modified braking device 312 has a modified sensor 332 instead of the sensor 32 of the first embodiment, a modified first brake arm 322 instead of the brake arm 22 of the first embodiment, and the wheel magnet 34 of the first embodiment has been relocated to form a modified tire 392 of a modified front wheel 314 in this third embodiment. In view of the similarity between the first and third embodiments, the parts of the third embodiment that are identical to the parts of the first embodiment will be given the same reference numerals as the parts of the first embodiment in FIGS. 11-13. Moreover, in view of the similarity between the first and third embodiments, it will be apparent to those skilled in the art from this disclosure that the descriptions and illustrations of the first embodiment also apply to this third embodiment, except as explained and illustrated herein. In other words, the descriptions of the parts of the third embodiment that are identical to the parts of the first embodiment may be omitted for the sake of brevity.

The brake device 312 basically includes the bicycle brake attachment member 20, the modified first brake arm 322, the second brake arm 24, the link member 26 (illustrated in the first embodiment), the pair of brake pads 28, the biasing member 30, the modified sensor 332, the wheel magnet 34 and the cycle computer 36 (illustrated in the first embodiment). The wheel magnet 34 is attached to a lateral interior sidewall in this embodiment, rather than the radially outermost interior wall of the tire 92 as in the first embodiment. In this embodiment, the modified sensor 332 is integrated with the primary braking structure. Specifically, the modified sensor 332 is preferably a cylindrical element that is press-fitted and/or snap fitted into a correspondingly sized recess of the modified brake arm 322 in a manner similar to the second embodiment. The sensor 332 includes a sensor element 382 enclosed therein that is electrically coupled to the cycle computer 36 via the electrical wire 86. The sensor 332 and the sensor element 382 are functionally identical to the corresponding parts of the first embodiment. In other words, the sensor 332 and the sensor element 382 are identical to the sensor 32 and sensor element 82 of the first embodiment, except the sensor 332 and the sensor element 382 have different shapes in this embodiment than the first embodiment such that the sensor 332 can be mounted in the recess of the modified brake arm 322. In this embodiment, the brake arm 322 is configured such that the sensor 332 is located laterally adjacent the modified tire 392 rather than radially outwardly of the tire 92 as in the first and second embodiments.

Fourth Embodiment

Figure 14:
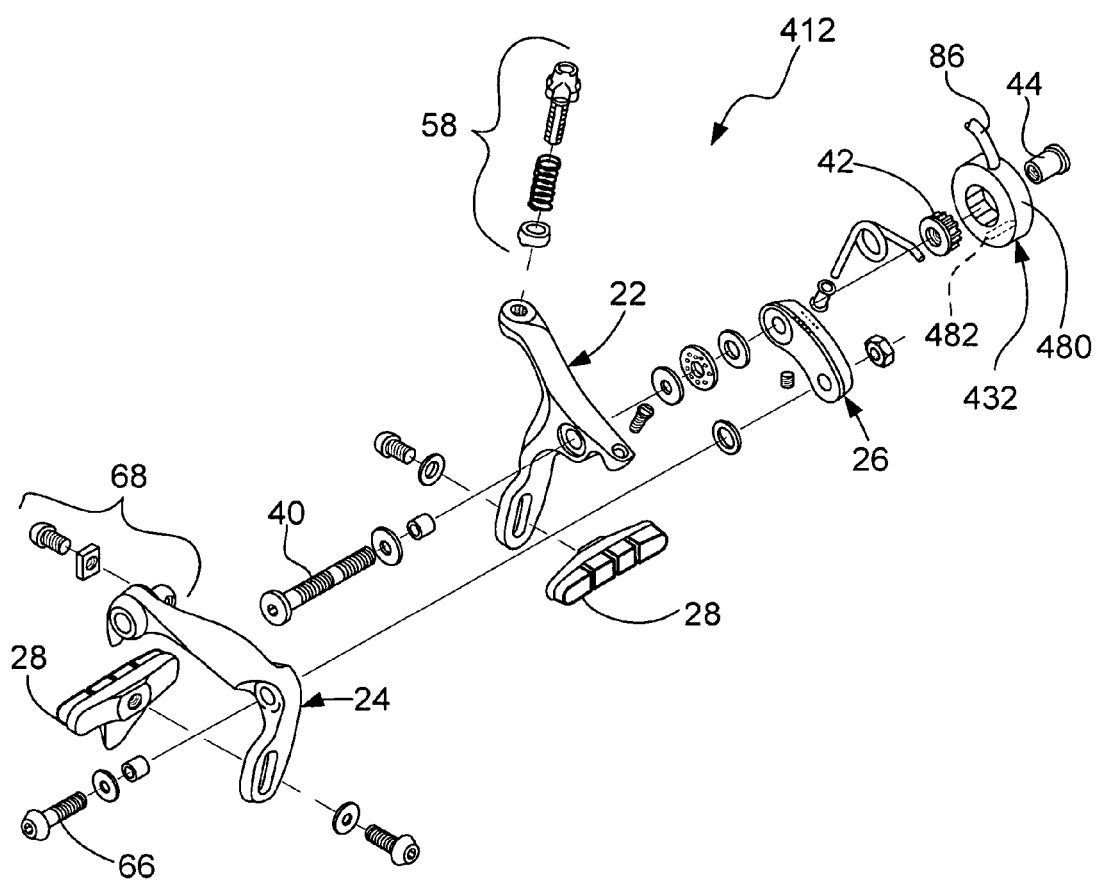
FIG. 14 is a partial, exploded perspective view of a portion of a brake device in accordance with a fourth embodiment of the present invention.

Referring now to FIG. 14, a modified braking device 412 in accordance with a fourth embodiment will now be explained. The braking device 412 is identical to the braking device 12 of the first embodiment, except the modified braking device 412 has a modified sensor 432 instead of the sensor 32 of the first embodiment. In view of the similarity between the first and fourth embodiments, the parts of the fourth embodiment that are identical to the parts of the first embodiment will be given the same reference numerals as the parts of the first embodiment in FIG. 14. Moreover, in view of the similarity between the first and fourth embodiments, it will be apparent to those skilled in the art from this disclosure that the descriptions and illustrations of the first embodiment also apply to this fourth embodiment, except as explained and illustrated herein. In other words, the descriptions of the parts of the fourth embodiment that are identical to the parts of the first embodiment may be omitted for the sake of brevity.

The brake device 412 basically includes the bicycle brake attachment member 20, the first brake arm 22, the second brake arm 24, the link member 26 (illustrated in the first embodiment), the pair of brake pads 28, the biasing member 30, the modified sensor 432, the wheel magnet 34 and the cycle computer 36 (illustrated in the first embodiment). In this embodiment, the modified sensor 432 has a modified mounting portion 480 with a sensor element 482 enclosed therein. Specifically, the modified sensor 432 preferably has a tubular mount portion 480 with a splined opening designed to be non-rotatably mounted on the brake fixing nut 42. The modified sensor element 482 is electrically coupled to the cycle computer 36 via the electrical wire 86. The sensor 432 and the sensor element 482 are functionally identical to the corresponding parts of the first embodiment. In other words, the sensor 432 and the sensor element 482 are identical to the sensor 32 and sensor element 82 of the first embodiment, except the sensor 432 and the sensor element 482 have different shapes in this embodiment than the first embodiment such that the sensor 432 can be mounted on the nut 42 in a different manner.

Of course, it will be apparent to those skilled in the bicycle art from this disclosure that a modified brake fixing nut (not shown) could be provided with the sensor 432 and/or the splined surface of the mounting portion 480 could be modified to be used with such a differently shaped nut as needed and/or desired.

Fifth Embodiment

Figure 15:
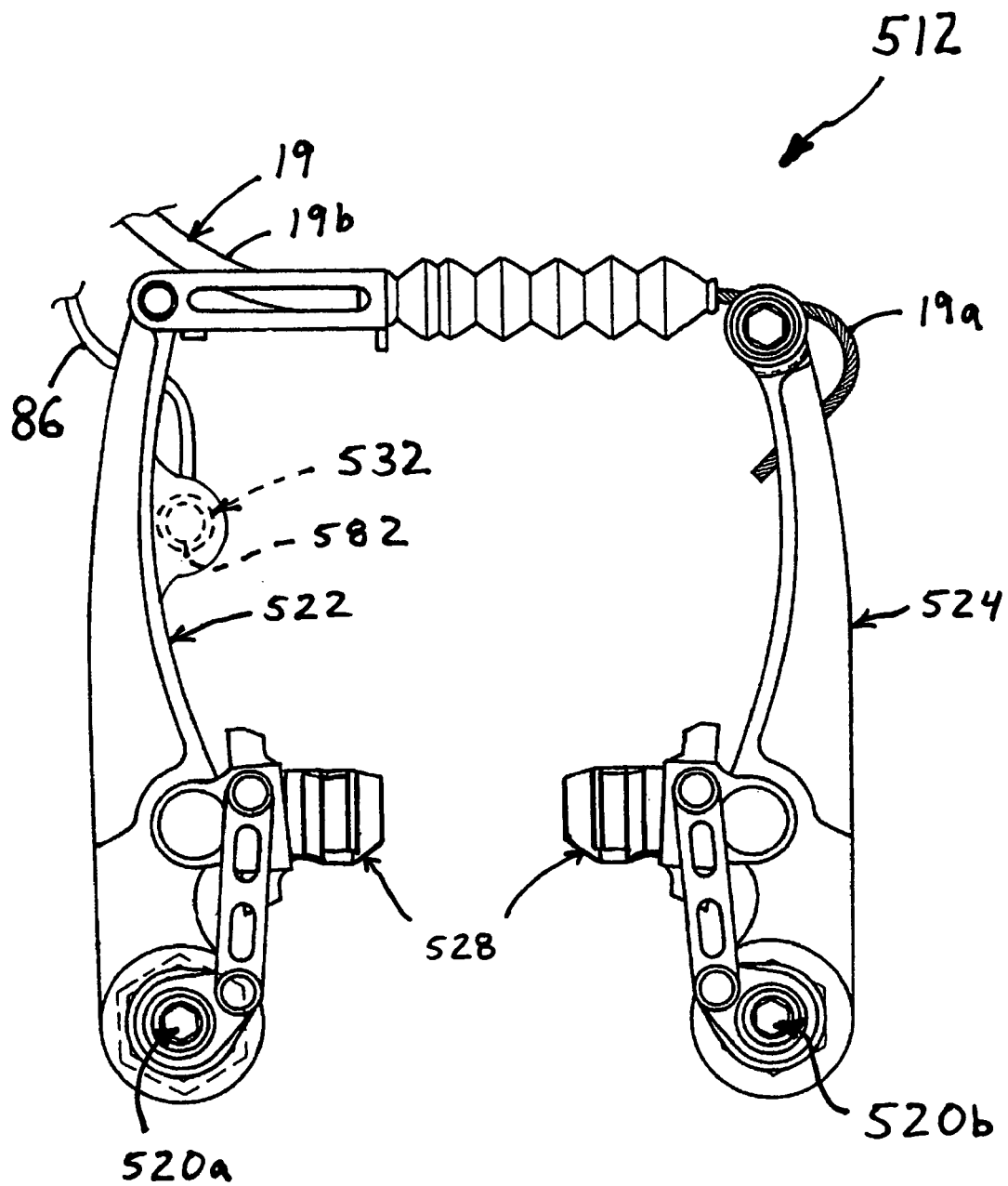
FIG. 15 is an enlarged front elevational view of a portion of a brake device in accordance with a fifth embodiment of the present invention.

Referring now to FIG. 15, a modified braking device 512 in accordance with a fifth embodiment will now be explained. The braking device 512 is a conventional V-brake, except the braking device 512 has a sensor 532 coupled to a modified first brake arm 522 in accordance with the present invention. Accordingly, because the brake device is relatively conventional, the brake device 512 will not be discussed and/or illustrated in detail herein, except as related to the present invention. Rather, it will be apparent to those skilled in the art from this disclosure that the brake device 512 includes various conventional parts and operates in a conventional manner, except as explained and illustrated herein. The brake device 512 is designed to be used with the modified tire 392 of a modified front wheel 314 of the third embodiment (not shown in FIG. 15). Moreover, the brake device 512 is configured to be mounted to a bicycle fork (not shown) similar to the fork 13 of the first embodiment in a conventional manner.

In view of the similarities between the first and fifth embodiments, the parts of the fifth embodiment that are identical to the parts of the first embodiment will be given the same reference numerals as the parts of the first embodiment in FIG. 15. Moreover, in view of the similarity between the first and fifth embodiments, it will be apparent to those skilled in the art from this disclosure that many of the descriptions and illustrations of the first embodiment also apply to this fifth embodiment, except as explained and illustrated herein. In other words, the descriptions of the parts of the fifth embodiment that are identical to the parts of the first embodiment may be omitted for the sake of brevity.

The brake device 512 basically includes a pair of conventional bicycle brake attachment members 520a and 520b, the modified first brake arm 522, a conventional second brake arm 524, a pair of conventional brake pads 528, a pair of conventional biasing members (not shown), the sensor 532, the wheel magnet 34 (as illustrated in the third embodiment) and the cycle computer 36 (illustrated in the first embodiment). The brake attachment members 520a and 520b are non-movably fixed to a front fork (not shown) similar to the fork 13 in a conventional manner. The brake arms 522 and 524 are pivotally mounted on the brake attachment members 520a and 520b, respectively, in a conventional manner. The biasing members (not shown) normally bias the brake arms 522 and 524 away from each other such that the brake pads 528 can be pressed against the rim 90 against the biasing force of the biasing members (not shown) in a conventional manner. The brake pads 28 are conventional V-brake pads. The brake control cable 19 is coupled to the upper ends of the brake arms 522 and 524 in a conventional manner.

The wheel magnet 34 is attached to a lateral interior sidewall in this embodiment in a manner identical to the third embodiment, rather than the radially outermost interior wall of the tire 92 as in the first embodiment. In this embodiment, the modified sensor 532 is integrated with the primary braking structure in a manner similar to the third embodiment. Specifically, the modified sensor 532 is preferably a cylindrical element that is press-fitted and/or snap fitted into a correspondingly sized recess of the modified brake arm 522 in a manner similar to the second and third embodiments. The sensor 532 includes a sensor element 582 enclosed therein that is electrically coupled to the cycle computer 36 via the electrical wire 86. The sensor 532 and the sensor element 582 are functionally identical to the corresponding parts of the previous embodiments. In other words, the sensor 532 and the sensor element 582 are identical to the sensor 32 and sensor element 82 of the first embodiment, except the sensor 532 and the sensor element 582 have different shapes in this embodiment than the first embodiment such that the sensor 532 can be mounted in the recess of the modified brake arm 522. In this embodiment, the brake arm 522 is configured such that the sensor 532 is located laterally adjacent the modified tire 392 rather than radially outwardly of the tire 92 as in the first, second and fourth embodiments.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle sensor unit comprising:
   a bicycle brake part; and
   a sensor fixedly attached to the bicycle brake part to detect rotational behavior of a bicycle wheel at a location radially outwardly of a brake pad relative to a center axis of the bicycle wheel when the bicycle brake part is coupled to a bicycle frame,
   the bicycle brake part being one of a bicycle brake attachment member configured to be non-movably coupled to the bicycle frame and a bicycle brake arm configured to support the bicycle brake pad for movement against a rim of the bicycle wheel.

2. The bicycle sensor unit according to claim 1, wherein the bicycle brake part is the bicycle brake attachment member.

3. The bicycle sensor unit according to claim 2, wherein the bicycle brake attachment member includes a brake fixing bolt, and the sensor includes a mounting portion that is supported on the brake fixing bolt.

4. The bicycle sensor unit according to claim 3, wherein the mounting portion of the sensor has a substantially U-shaped configuration with two ends coupled together with a fastening structure.

5. The bicycle sensor unit according to claim 1, wherein the bicycle brake part is the bicycle brake arm.

6. The bicycle sensor unit according to claim 5, wherein the bicycle brake arm is configured and arranged to be pivotally coupled to a bicycle brake fixing bolt that is fixedly coupled to the bicycle frame.

7. The bicycle sensor unit according to claim 6, wherein the bicycle brake arm includes a brake pad fixedly coupled thereto, the sensor being separate from the brake pad.

8. The bicycle sensor unit according to claim 7, wherein the sensor is coupled to the bicycle brake arm at a location radially outwardly of the brake pad relative to a center axis of the bicycle wheel when the bicycle brake arm is coupled to the bicycle frame.

* * * * *